United States Patent Office 2,793,932
Patented May 28, 1957

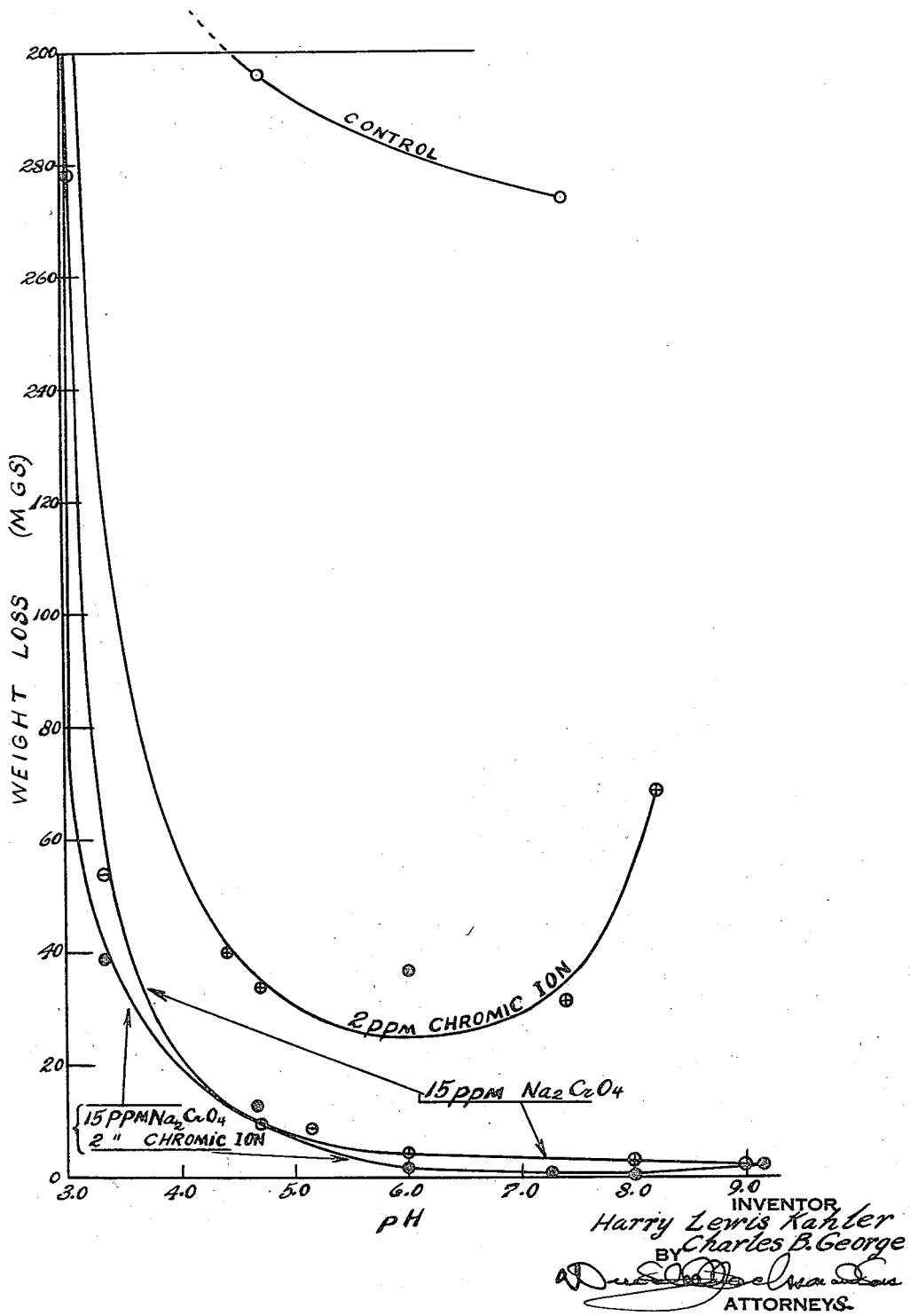

2,793,932
CORROSION INHIBITING

Harry Lewis Kahler, Feasterville, and Charles B. George, Philadelphia, Pa., assignors to W. H. & L. D. Betz, Philadelphia, Pa., a partnership Application November 9, 1953, Serial No. 390,916

5 Claims. (Cl. 21—2.7)

The present invention relates to the inhibiting of corrosion in industrial water systems, such as heat exchangers, cooling towers, and processing water systems. The invention is applicable to protect corrodible metal components in such systems, especially iron and steel, copper and copper base alloys, aluminum and aluminum base alloys, and other metals and alloys used in such systems.

In accordance with the present invention it has been discovered that corrosion of metals in an industrial water system is very effectively prevented by using chromium in the water in the form of both chromic ion and chromate.

The invention relates to new formulations for inhibiting corrosion and methods of using the same. While the invention is mainly directed to industrial water systems in which water is the corroding medium, it is also applicable to systems in which a corrosive solution of some other material with water is present.

The ability of soluble chromates to inhibit corrosion and reduce the wastage of metal in industrial water systems has long been known. By chromates, it is intended specifically to designate compounds in which chromium is in the hexavalent form. The chromates are the only compounds containing chromium which are known to have corrosion inhibiting properties (U. R. Evans, Metallic Corrosion, Passivity and Protection, page 557). Chromate has been extensively applied in the treatment of cooling water used in air conditioning units, in engine jackets, in brine refrigerating systems, and in industrial cooling processes. Generally the practice has been to apply alkali metal chromates with additive materials such as sulphuric acid or caustic soda solely for adjusting the pH of the water to an optimum level such as 7 to 9.

Notwithstanding the wide and successful use of water soluble chromates to inhibit corrosion in plant applications, they possess certain inherent properties that dictate caution in their promiscuous use. It has been generally known and accepted that chromate in inadequate concentrations may prove actually harmful rather than useful, leading to aggravated metal attack and reduced service life. Certain minimum levels of concentration of chromate as used in the prior art are recommended and must be maintained. These minimum concentration levels vary depending on the corrosivity of the water, higher minimum concentrations being required as the corrosivity increases (C. van Brunt and E. J. Remsheid, 39 General Electric Review 128 (1936)). Some factors affecting such corrosivity are temperature, concentrations of chloride and sulfate ions, circulating flow, oxygen concentration and pH.

It would be possible to inhibit corrosion almost completely if chromate concentrations were maintained high enough. However, such adequate chromate concentrations are not economically practical except where the volume of water treated is very low. Economic considerations dictate the use of the smallest concentration of chromate which will give satisfactory protection to the industrial water system. In the larger cooling water systems where the volume of water used is enormous, the amount of chromate required for adequate inhibition of corrosion by chromate alone would be economically prohibitive.

The deficiencies of corrosion protection by chromate alone have presented a challenge, and research workers have devoted considerable effort and thought toward overcoming these difficulties. Much of this effort has been directed to the control of water characteristics, and the formulation of other water soluble compounds that contain chromate chemically or physically combined. Naturally such compounds were expected to add sufficient power of inhibition to the chromate to make it effective in lower concentrations where it has lacked sufficient inhibitory power. As a result of earlier research, it has been shown in Kahler U. S. patent application Serial No. 364,871 (originally Serial No. 145,988, filed February 24, 1950, and now abandoned), filed February 24, 1950, for Corrosion Protection in Water Systems, that phosphate can bolster the weaknesses of chromate.

As a result of further research, we have discovered that trivalent chromium itself is remarkably capable of protecting industrial water systems against corrosion, but more surprisingly that the inhibitory power of chromates containing hexavalent chromium is greatly improved by the presence of trivalent chromium in the water. Thus in a range of concentration where hexavalent chromium itself would be positively harmful, we find that hexavalent chromium can be made effective as an inhibitor if trivalent chromium in relatively minute amounts is also present.

We have discovered that compounds containing trivalent chromium produce excellent corrosion protection in an entirely new and different manner. Where trivalent chromium compounds are introduced into an industrial water system under conditions where an insoluble coating of trivalent chromium is formed, remarkably good protection is obtained. The insoluble chromium coating exercises a high degree of corrosion protection itself, while acting essentially as a barrier by preventing corrosive constituents of water from reaching the metal surface.

Trivalent chromium in the presence of hexavalent chromium produces a corrosion resisting power which is superior to chromate alone both in degree and also in obtaining less destructive metal attack. The method of corrosion control according to the invention is superior to the corrosion control by chromate alone because it supplies a durable and adherent coating which can be controlled as later explained, and which itself has a measure of corrosion inhibitory power while at the same time it reverses the effect of the chromate in low concentration, making the chromate helpful where it would otherwise be harmful, and in higher concentrations greatly enhancing the effect of the chromate.

A purpose of the invention is to provide an improved corrosion inhibitory composition and method.

A further purpose is to render corrosion inhibition of a high quality more economical.

A further purpose is to obtain more effective corrosion inhibition from small concentrations of chemicals.

A further purpose is to insure against harmful toxic effects by the use of smaller quantities of chromate.

There are several ways in which the invention can be applied successfully. Trivalent chromium is a reasonably good corrosion inhibitor in very small concentrations. Thus for some types of services, it would be sufficient to employ from 0.1 to 100 and preferably from 0.1 to 25 and most desirably from 0.2 to 3 parts per million of trivalent chromium alone added to the water as a water soluble salt. Suitable salts for feeding trivalent chromium are chromic chloride, chromic fluoride, chromic nitrate, chromic sulphate, chromic acetate and the like, the water soluble forms being used in every case. Any other suitable trivalent chromium compound may be employed. For example $Cr_2O_3$ can be dissolved in acid.

In the presence of oxygen, chromous salts readily oxidize to chromic, and so chromous salts can be fed as a source of chromic ions.

In most cases, however, it is decidedly preferable not to feed trivalent chromium alone, but to use trivalent chromium in a water soluble form along with a chromate, the chromium being present primarily as chromates. We have found that by this procedure chromates can be made effective as corrosion inhibitors in low concentration levels where susceptible metals such as steel would otherwise be subjected to aggressive localized attack because of the anodic nature of the chromate inhibitor (U. R. Evans, Metallic Corrosion, Passivity and Protection, page 535), and at the same time making an equal amount of chromium more effective where it is distributed in the chromic and chromate forms.

In accordance with the invention, the highly desirable property of completely stifling all corrosive attack (metal loss and pitting) is made available at low chromate concentrations plus the chromic coating when it was formerly only available at high chromate concentrations alone, and at the same time the pitting tendency which would normally occur at low chromate concentrations alone is effectively restrained by the combination.

The invention in this aspect operates by utilizing the property of the trivalent chromium which in water solution readily forms insoluble chromic compound coatings. These coatings, while highly insoluble, precipitate readily and with no discrimination as to the corrosion activity occurring at the metal surface. Analysis of the coatings indicates that chromium precipitates predominantly as a blue-green or blue-gray-green hydroxide or variation thereof as $Cr_2O_3 \cdot XH_2O$, with possible small amounts of carbonate, silicate, etc. included.

Example I

Two parts per million of trivalent chromium was fed to an industrial water system using Philadelphia city tap water to which ions were added in varying amounts to cover a range of total hardness up to 500 p. p m. as calcium carbonate, chlorides to 500 p. p. m., sulfates to 300 p. p. m., and pH ranging from 3.0 to 9.0 over a series of tests at temperatures ranging from 50° F. to 150° F. The weight loss in one day is shown in the curve marked 2 p. p. m. chromic ion in the drawing. This was found to be decidedly better than the control also shown in the drawing. This was also compared to 15 p. p. m. sodium chromate shown in the figure.

Though 2 p. p. m. trivalent chromium ion is inferior to 15 p. p. m. sodium chromate, it is decidely better than the control, and less costly than 15 p. p. m. sodium chromate.

Applicants have concluded that from 0.1 to 100 p. p. m. trivalent chromium ion is effective as an inhibitor at a temperature between freezing and boiling of water in a pH range from 3.0 to 8.5.

Example II

The tests referred to in Example I were carried on using 15 p. p. m. of sodium chromate and 2 p. p. m. of trivalent chromium ion, with the same water as in Example I, compared to the same control and over the same temperature range. The level of chromate was selected as well below a recommended safe concentration of chromate under previous practice. The trivalent chromium ion as a protective coating agent imparted to the chromate such an improvement in general corrosion, pitting and tuberculation protection that stifling of attack was satisfactory, and weight loss in one day was reduced with respect to that with chromate alone as shown in the drawing.

Thus it is seen that neither chromate nor trivalent chromate alone develops the effectiveness as a corrosion inhibitor which occurs when these are used in combination. The limitations of chromates alone have already been discussed. It has already been shown that while chromium alone in trivalent form provides an adherent coating and gives good metal protection it is not nearly as effective as the combination of trivalent chromium and chromate. Each of these ingredients plays its part in obtaining improved behavior. The combination of trivalent chromium and chromate reduces the metal loss 98 percent with respect to chromium alone and up to 50 percent over chromate alone in short time accelerated tests. Even where pits had reached an incipient stage, the combined treatment of trivalent chromium and chromate successfully covered them and prevented further pits and tuberculation.

In addition to the excellent results shown in the drawing, we found that the addition of trivalent chromium ion prevented the localization of the attack. In every one of a series of tests the presence of trivalent chromium with the chromate reduced pitting attack directly or spread the reduced metal loss more widely over the specimen. Both of these actions are highly desirable in that perforation of the metal in contact with corrosive waters is prevented. Chromates themselves without the resulting coating produced by trivalent chromium permitted pitting when used in relatively low concentration. This undesirable tendency was eliminated or minimized by the dense adherent coating produced by the trivalent chromium.

Although we are not certain of the precise mechanism by which chromium functions alone or in combination, we postulate the following without basing the disclosure upon the validity of this explanation. When used alone, the trivalent chromium produces an insoluble coating which adheres tenaciously to metal surfaces exposed to the water in the industrial water system, and also to other materials such as rubber, glass, the copolymer of vinyl chloride and polyvinylidene chloride, etc. The soluble chromic compounds alone, even in the absence of chromate, can cut down metal losses as shown in the figure. The use of the trivalent chromic ion to form a corrosion resistant coating results in a very good corrosion inhibitor even when the chromate is not present. However, the most outstanding property of the trivalent chromium is the ability to spread the attack from a dangerous pitting which can take place in the presence of low concentrations of chromate alone, to a more generally distributed attack. With control of pitting, tuberculation is also reduced in direct proportion, as tuberculation results from pitting.

The combination of trivalent chromium and chromate obtains the cooperative benefit of the strong points of each treatment, retaining the weight saving power of the chromate and the spreading or dispersing power of the trivalent chromium coating for the control of pitting and tuberculation.

The tendency of the chromate in low concentrations alone to permit anodic pitting and tuberculation is overcome by the stronger spreading action of the chromic coating. The weakness of the chromic coating, that is, its inability to equal the metal saving power of the chromate, is overcome by combining the chromic coating with chromate. The present invention employs the mutually additive desirable qualities of each material and uses each to overcome the weakness of the other.

The trivalent chromium compounds possess another desirable quality, the very low rate of solution of the coating. This feature is extremely important if treatment is temporarily stopped, since the coating has a high stability due to its low rate of solution. The trivalent chromium coatings are very desirable and lasting even during periods when treatment is stopped. It has been found that the best concentration levels in feeding trivalent chromium are from 0.2 to 3 p. p. m. of chromic ion, although very good results are obtained in the range from 0.1 to 25 p. p. m. and good results are obtained in the range from 0.1 to 100 p. p. m., providing the thick deposits can be tolerated at the higher concentrations. Chromium concentrations down to 0.1 p. p. m. are effective when in combination with chromate concentrations in the range of from 5 to 10,000 p. p. m. calculated as $Na_2CrO_4$ or in the range from 1 to 10,000 p. p. m. calculated as $Na_2CrO_4$, with waters of lesser corrosivity. Above 3 p. p. m. chromic ion, the coating deposit becomes heavy and higher concentrations therefore may be tolerated only where the thick coating is needed to combat excessive corrosivity or where the coating thickness does not interfere with flow rate and heat transfer.

The range of chromate concentration is not critical, but in general it is expected that chromate will be used within the range of 1 to 10,000 p. p. m. calculated as $Na_2CrO_4$ and preferably in the range from 1 to 200 p. p. m. calculated as $Na_2CrO_4$, and most desirably in the range from 5 to 25 p. p. m. calculated as $Na_2CrO_4$, the chromate being desirably kept low because of economic considerations, toxicity, etc.

The chromate may be incorporated into the water by adding a water soluble chromate or dichromate preferably an alkali metal chromate or dichromate. Suitable chromates include sodium dichromate dihydrate, $Na_2Cr_2O_7.2H_2O$; sodium chromate anhydrous, $Na_2CrO_4$; sodium chromate tetrahydrate, $Na_2Cr_4.4H_2O$; sodium chromate hexahydrate, $Na_2CrO_4.6H_2O$; sodium chromate decahydrate, $Na_2CrO_4.10H_2O$; potassium dichromate, $K_2Cr_2O_7$; potassium chromate, $K_2CrO_4$; and chromic acid, $CrO_3$.

We have found that the precipitation of the chromium occurs within the pH range of 3.0 to 8.5. It should be emphasized that the chromium oxide (hydrated) which is formed is amphoteric in nature, and the coating from which the added benefit is obtained does not deposit below pH 3 and above pH 8.5.

The coating of chromic compound can become so thick if excessive concentrations of trivalent chromium are used as to interfere with heat transfer, clog passages, freeze moving parts and cause similar evils. It is necessary that the coating be properly controlled to give maximum protection against corrosion and minimum interference with heat transfer, minimum resistance to water flow, and avoidance of excessive sludging. Such control can be practiced effectively by regulation of the concentration of the chromic ion used in the combined treatment and in exceptional cases by pH control in view of the amphoteric nature of the coating compound. In accordance with the invention we propose treatments that use economical and protectice concentrations of chromate in combination with sufficient soluble trivalent chromium compound to produce coating protection.

It has been found that the pH is not critical within the range defined, although it will be understood that preferential ranges of pH within the range defined may be determined for the particular water by considerations of hardness, end use of the water and temperature as well known. Under plant conditions and in laboratory studies we have found that the coating exhibits a low rate of solution with attendant freedom from the need for constant and proportionate feed of chromium ion. Thus the chromium ion may be fed in increments if desired, although continuous feeding is preferred for best results.

The principles of the invention are applicable throughout the range of water temperature from freezing to boiling (under the particular conditions of pressure), although the invention is believed to have its widest application in the range between 50 and 180° F.

The combined treatment of chromium and chromate may be used in one of several different ways. As already explained, the chromate component is not critical in concentration and offers no solubility problem. The soluble chromium salt should be precipitated only within the water system so that the coating is laid there. In introducing feed solutions, whether they are made up for separate chromium feed or for feed of chromium and chromate together, the pH of the solution fed should be maintained sufficiently low to prevent precipitation of the chromium prior to its introduction into the main flow of the system. Under these conditions of feed, the chromium ion enters slowly into the main water system where it passes through the colloidal stage and through the precipitating stage at a slow rate so that it can give good coverage and protection. If the precipitate is shocked abruptly out of the solution, the covering power of the coating is lost along with a good portion of the protection.

The best and easiest way of introducing a controlled amount of chromium ion is by the direct addition of a soluble chromic salt to the feed solution. It is also permissible to introduce a soluble chromous salt, under conditions in which it will be oxidized.

A second practical and economical method because of the cost differential between chromium salts and chromates is the partial and controlled reduction of chromate by the inclusion of a reducing agent in the treatment.

*Example III*

In this case the feed consists of sodium chromate plus sodium sulphite and sulphuric acid as follows:

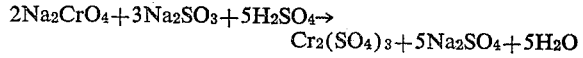

$$2Na_2CrO_4 + 3Na_2SO_3 + 5H_2SO_4 \rightarrow Cr_2(SO_4)_3 + 5Na_2SO_4 + 5H_2O$$

By using less sulphite any desired combination of chromate and chromic salt may be obtained. The acidity may be obtained by using dichromate, acid sulphite or by adding sulphuric acid as noted. Other suitable reducing agents may be used, such as sugar, molasses, alcohols, other sulphites, etc. The water itself may contain a reducing agent such as sulphides or mercaptans. This is true of the corrosive waters which contain sodium sulphide of mercaptans.

*Example IV*

In this case the water contains 3 p. p. m. of $H_2S$ and it is fed with 15 p. p. m. of sodium chromate. Hydrogen sulphide reduces the chromate to the chromic salt. In this case the reduction takes place in the water system itself rather than in the feed solution.

Control methods for regulating the degree and measure of protective coatings have been suggested above. The feed of the treatment is made proportionate to the corrosive conditions. Because of the low solubility of established insoluble chromium coatings, intermittent feeding is practical.

In view of our invention and disclosure variations and modifications to meet individual whim or particular need will doubtless become evident to others skilled in the art, to obtain all or part of the benefits of our invention without copying the process and product, and we therefore claim all such insofar as they fall within the reasonable spirit and scope of our claims.

Having thus described our invention what we claim as new and desire to secure by Letters Patent is:

1. The method of protecting iron and steel in an industrial water system, which comprises introducing into solution in the water of the system from 0.1 to 100 p. p. m. of trivalent chromium and from 1 to 10,000 p. p. m. of hexavalent chromium calculated as $Na_2CrO_4$ at a pH in the system of 3 to 8.5.

2. The method of protecting iron and steel in an industrial water system, which comprises introducing into solution in the water of the system from 0.1 to 25 p. p. m. of trivalent chromium and from 1 to 200 p. p. m. of hexavalent chromium, calculated as $Na_2CrO_4$ at a pH in the system of 3 to 8.5.

3. The method of protecting iron and steel in an industrial water system, which comprises introducing into solution in the water system from 0.2 to 3 p. p. m. of trivalent chromium and from 5 to 25 p. p. m. of hexavalent chromium calculated as $Na_2CrO_4$ at a pH in the system of 3 to 8.5.

4. The method of protecting iron and steel in an industrial water system, which comprises introducing into solution in the water of the system hexavalent chromium at a pH in the system of 3 to 8.5, and reducing from 0.1 to 100 p. p. m. of chromium in the system to trivalent chromium, leaving from 1 to 10,000 p. p. m. of hexavalent chromium calculated as $Na_2CrO_4$.

5. The method of protecting iron and steel in an industrial water system in solution in the water from 0.1 to 100 p. p. m. of trivalent chromium and from 1 to 10,000 p. p. m. of hexavalent chromium calculated as $Na_2CrO_4$ at a pH in the system of 3 to 8.5, precipitating on the iron or steel a protective chromic coating and thereby securing a dispersive spreading action and concurrently saving metal loss by maintaining the soluble chromate in the water of the system in contact with the coating.

References Cited in the file of this patent

UNITED STATES PATENTS

| | | |
|---|---|---|
| 2,391,895 | Gunderson | Jan. 1, 1946 |
| 2,483,510 | Stareck | Oct. 4, 1949 |
| 2,520,475 | Sonnino | Aug. 29, 1950 |
| 2,559,812 | Watson | July 10, 1951 |
| 2,559,878 | Johnson | July 10, 1951 |
| 2,606,157 | Cardwell et al. | Aug. 5, 1952 |

FOREIGN PATENTS

| | | |
|---|---|---|
| 331,725 | Great Britain | July 10, 1930 |
| 821,736 | France | Dec. 11, 1937 |
| 835,828 | France | Jan. 4, 1939 |